United States Patent [19]

Shaw

[11] Patent Number: 5,164,865
[45] Date of Patent: Nov. 17, 1992

[54] SYSTEM AND METHOD FOR LOCATING INFORMATION ON A CONTINUOUS IMAGE MEDIUM

[76] Inventor: Ronald J. Shaw, 140 The Village, Redando Beach, Calif. 90277

[21] Appl. No.: 335,857

[22] Filed: Apr. 10, 1989

Related U.S. Application Data

[63] Continuation of Ser. No. 94,109, Sep. 8, 1987, abandoned.

[51] Int. Cl.⁵ .................. G11B 15/18; B42F 21/00
[52] U.S. Cl. .................. 360/72.2; 283/43; 353/26 R; 434/315
[58] Field of Search .............. 360/137, 70, 71, 72.1, 360/72.2, 72.3; 434/308, 307, 315, 316; 353/26 R, 26 A; 283/36, 37, 38, 39, 40, 41, 42, 43

[56] References Cited

U.S. PATENT DOCUMENTS

| | | | |
|---|---|---|---|
| 1,233,076 | 7/1917 | Lowenstein | 353/26 R |
| 1,889,575 | 11/1932 | Sebille | 353/26 R |
| 2,124,906 | 7/1938 | Bryce | 353/26 A |
| 2,735,334 | 2/1956 | Emery et al. | 353/26 R |
| 4,185,900 | 1/1980 | Rabindran et al. | 353/26 R |
| 4,634,146 | 1/1987 | Yaniv | 283/43 X |

Primary Examiner—Andrew L. Snezek
Attorney, Agent, or Firm—Robert J. Schaap

[57] ABSTRACT

A method and a system for locating and accessing information on a continuous image presentation medium, such as information from a video medium, e.g. a video tape or disk. The system and method use an index which contains topics of interest on the medium and a code of indicia, such as a time elapse code identifying a portion of the video tape or disk in which desired information may be obtained. Corresponding time elapse codes are visually presented on the video images. Thus, the user will locate the time code from the index representing the time elapse period from the beginning of the tape or disk and move the tape until the time code is identified visually on the visual presentation from the tape or disk. In a preferred embodiment, the video or other visual presentation is used with printed material. The printed material may adopt the form of a multi-page document, such as a manual, and the manual may be provided with an index for identifying pages from which selected information may be obtained. In addition, the manual or the index, or both, may also contain indicia, such as time codes, identifying certain portions of the video tape in which corresponding information may be located.

26 Claims, 2 Drawing Sheets

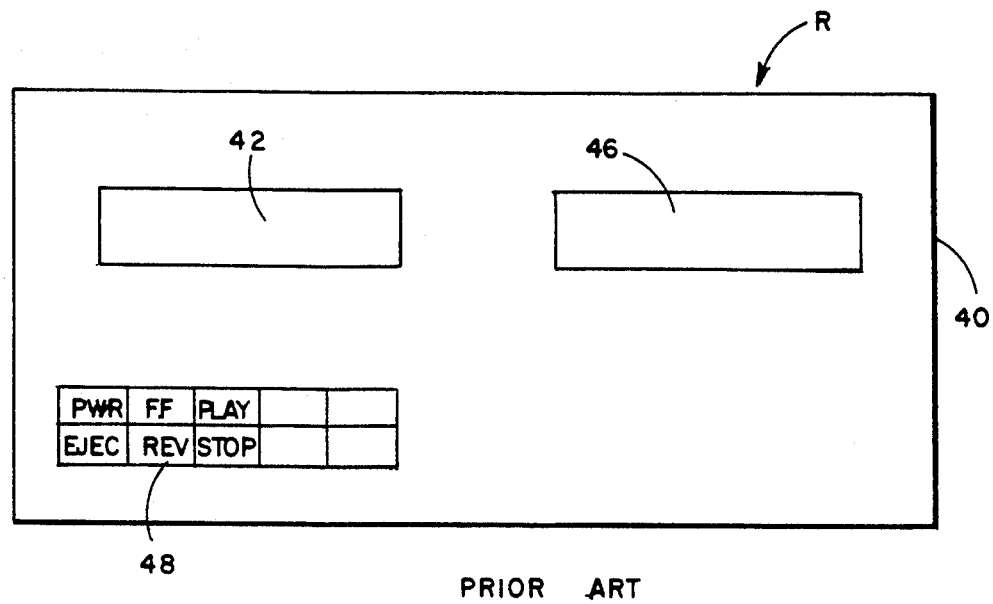
FIG. 5            PRIOR ART
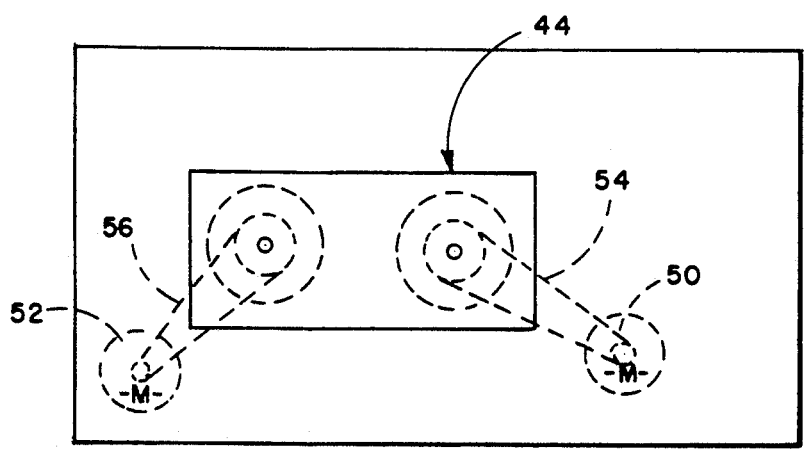
FIG. 6            PRIOR ART

SYSTEM AND METHOD FOR LOCATING INFORMATION ON A CONTINUOUS IMAGE MEDIUM

RELATED APPLICATION

This application is a continuation of my copending application Ser. No. 094,109, filed Sep. 8, 1987 now abandoned.

BACKGROUND OF THE INVENTION

1. Field of the Invention

This invention relates in general to certain new and useful improvements in locating information in a visual image presentation system, and more particularly, to a visual image presentation system and method utilizing an index for locating and quickly accessing information in a continuous image presentation medium, and even more specifically, to a system and method using both printed material and a continuous image system in which the printed material is correlated to continuous image presentations.

2. Brief Description of the Prior Art

The use of continuous image presentation media for presenting information, including for example, continuous motion picture films and the like, has been well known. In recent years, the use of a video medium, such as a video tape or video disk, used in conjunction with a video player has also received increased popularity as a means for presenting information. However, in each of these continuous image presentation media, there is no means for locating a segment in the tape or disk or motion picture film and rapidly accessing that segment of information. This is particularly true in the case of the video medium where the information contained on the medium is not initially in visible form and, in effect, is only in "machine readable form".

The concept of time coding a video tape has been previously used in producing video tapes for purposes of editing the same. When an organization is attempting to produce a video tape, the tape is encoded with a time code commencing from the beginning of the tape. Thus, the tape is encoded automatically with a digital code and which is non-visible to the user to provide a time elapse from the beginning of the tape. As an example, a selected segment of the tape may contain a code identifying 23 seconds into the tape from the beginning.

For purposes of editing, this timed code data can be retrieved and re-presented in a visible format on a timecode reader. In this way, for purposes of editing the tape, the editors can immediately locate information which they wish to delete from the video tape.

In recent years, the wide-spread use of video tape and disk players has given rise to the use of video tape and video disks as a means for presenting instructional material which was previously only contained in printed documents. The use of a video medium, particularly in conjunction with printed material not only speeds the assimilation of the material, but it also enables the party attempting to acquire such information to obtain a better and more complete understanding of the material which he or she is attempting to assimilate.

For many years, automotive vehicle manufacturers and other producers of equipment have provided manuals describing the use and operation and/or maintenance of the various equipment which they are producing and offering to the public. In the case of the automobile manufacturer, the manual will contain instructions on how to use the automobile, how to service the automobile, the time intervals at which services should be maintained, and general maintenance, as for example, changing of the oil, or changing of the tires, which may be performed by the owner.

Many of the manuals which are produced by these companies offering equipment usually contain pictorial illustrations in an attempt to further aid an understanding of the information which is conveyed. However, inasmuch as the illustrations are necessarily limited by both the amount of space in the manual and cost factors, it would be desirable to have additional media presenting illustrations.

The use of a video medium containing pictorial information along with the printed information ca be quite beneficial in presenting instructions on the play of a game. For example, if a tennis player desired to obtain more information on a certain type of swing, he or she could access an instructional manual and then locate the corresponding information on a video tape about that swing. This combination would be far more beneficial than mere printed information and two dimensional static illustrations alone.

The use of the video medium has been found to be a highly effective way of conveying information to parties attempting to assimilate this information. Moreover, when used in conjunction with a printed manual, the use of both mediums can be quite beneficial. However, one of the principle draw-backs of the use of both the printed material and the video tape medium is the fact that it is difficult to locate information in the tape medium which corresponds to the information in the printed manual. Thus, for example, if the user of the manual desires to change the oil of the vehicle and wants to obtain information about the changing of the oil, he or she can immediately address the printed manual provided with the automobile by the manufacturer. In like manner, the user would also examine the material contained in the video tape. However, heretofore there was no convenient means for locating and then retrieving that information from the video tape.

The use of a counter on a video tape player to locate a certain portion of a video tape is a poor technique as the counters on presently available video players are notoriously inaccurate. Moreover, even if the counters were accurate, the fact that the tape medium may expand or contract renders locating information on a video tape by a counter to be a fairly inaccurate process.

There have been other uses of time code information on video tapes, as for example, the presentation of a clock depicting time for a sporting activity. Thus, a clock depicting the amount of time for a particular race may be inset on the video tape frame so that the viewer can observe the activities of the race and simultaneously determine the amount of time elapsed from the beginning of the race.

OBJECTS OF THE INVENTION

It is, therefore, one of the primary objects of the present invention to provide a method and a system for locating and rapidly accessing information contained in a continuous image presentation medium.

It is another object of the present invention to provide both a method and a system of the type stated for locating and rapidly accessing information contained in a continuous visual image presentation medium by utilizing an index containing codes of location of information on the medium with identifying corresponding codes visually depicted on the visual presentations from the medium.

It is an additional object of the present invention to provide a method of assimilating information and performing a task by using a dual media presentation containing printed material and continuous image material where the printed material can be coded with indicia corresponding to the continuous image material.

It is a further object of the present invention to provide a method of assimilating information of the type stated in which printed material is provided along with an index of indicia and which corresponds to visible indicia on continuous images presented from a continuous image medium.

It is also an object of the present invention to provide a method and a system for presenting information in two different media, including a printed medium and a continuous image presentation medium and which system comprises an index having a time code related to a time code visually presented on some or all of the frames of the continuous image medium so that a user can readily select a portion of the continuous image presentation medium to examine.

It is still another object of the present invention to provide a method which is simple to use and which is highly effective in enabling the coordination of printed material and a continuous image presentation.

It is still another salient object of the present invention to provide a system of the type stated which is highly effective in operation and which can be produced at a relatively low cost.

With the above and other objects in view, my invention resides in the novel features of form, construction, arrangement and combination of parts presently described and pointed out in the claims.

BRIEF SUMMARY OF THE INVENTION

In general terms, the invention relates to both a method and a system for locating and quickly accessing information in a continuous image presentation medium. The method primarily relies upon the use of an index which contains a code of indicia and the continuous images which are presented from the continuous image presentation medium will also visually contain a corresponding code of indicia.

The continuous image presentation medium is preferably a video medium which may adopt the form of a video tape medium, a video disk medium, or the like. In addition, the continuous image presentation medium may also be present in the form of a continuous film, as for example, a continuous motion picture film. Essentially any type of continuous image presentation medium which enables sequential images providing a pictorial message, and preferably a sound message, as well, may be employed in connection with the present invention.

The code of indicia, in a more preferred embodiment is a time elapse code. Thus, the index will contain the topics of interest which may be included in the visual image presentation medium, along with a time elapse code identifying the position on the tape or disk or motion picture film in which the desired information may be sought. The time elapse code will identify a portion of the tape or disk or continuous film in which the selected information to be assimilated is located with reference to the beginning of the tape or disk or film.

The code in the index may identify a portion of the tape or other image medium from the beginning and includes designations of hours, minutes and seconds. The code may read, for example, 0 hours, 10 minutes, and 21 seconds. Thus, the user of the system will fast-forward the continuous image medium, e.g. a video tape in a video tape player to a position corresponding to movement of the tape to 0 hours, 10 minutes and 21 seconds. At that point, the user of the system will immediately have located the beginning of the tape segment containing information which is desired.

In a more preferred embodiment, the invention relates to a method of accessing information and performing task utilizing such information. The method utilizes printed materials, which may be in the form of a multi-page manual, and a continuous image presentation.

The multi-page manual or other printed material in accordance with the present invention, may also be provided with an index, if desired. The term "index" is used in a broad sense to include a "table of contents" and like identifying information which enables a user of the system to locate information in the printed material and/or locate information in the continuous image presentation medium, as hereinafter described.

The index may form part of the manual itself, or it may be provided separate from the manual. The index will contain a brief summary or caption of the material contained in the multi-page manual with indicia identifying the portion of that manual or otherwise, identifying that portion of the continuous image medium from which the user may wish to select information. The indicia in the manual is preferably a simple numeric numbering system such that one examines a title of certain information contained in the manual, locates the indicia (a page number) located to the right of the summary or caption, and thereafter, attempts to select that page in the manual in order to assimilate the information contained on that page of the manual.

The index and/or the pages of the manual containing the information which the user wishes to assimilate may also contain a code of indicia identifying the location on the continuous image medium having information corresponding to the selected pages of the manual. This code of indicia is preferably a time-elapse code. Thus, a time elapse from the beginning of a continuous image medium or a certain portion of the continuous image medium, will be identified on the index and perhaps on the page of the manual, as well, containing the information which the user wishes to assimilate. Thus, if the user accesses a page of the manual containing information he or she wishes to assimilate and also wishes to correspondingly obtain related information from the continuous image medium, he or she will look for the time code identified in the index or on the manual page to identify the beginning of that portion of the information on the continuous image medium. In accordance with this arrangement, the user of the system will be able to examine information contained in the manual and simultaneously examine the video or other continuous image presented material on the same topic.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
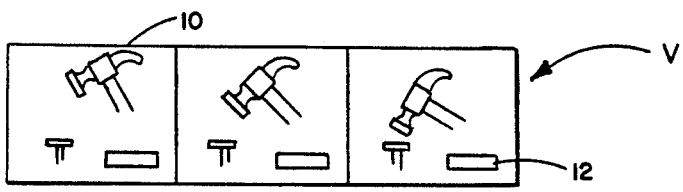
Figure 2:
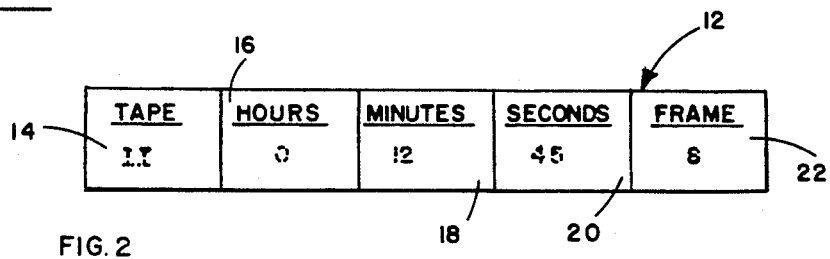
Figure 3:
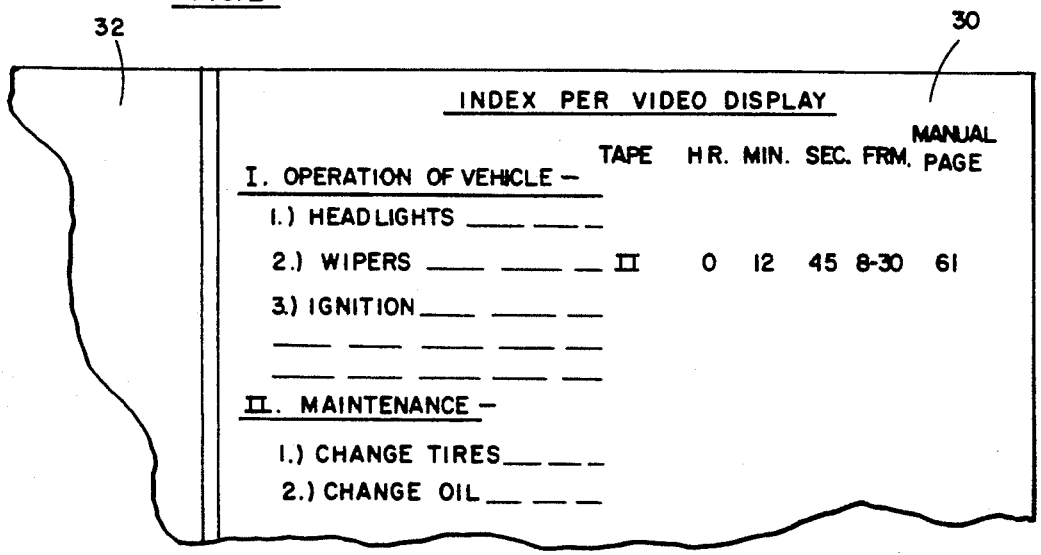
Figure 4:
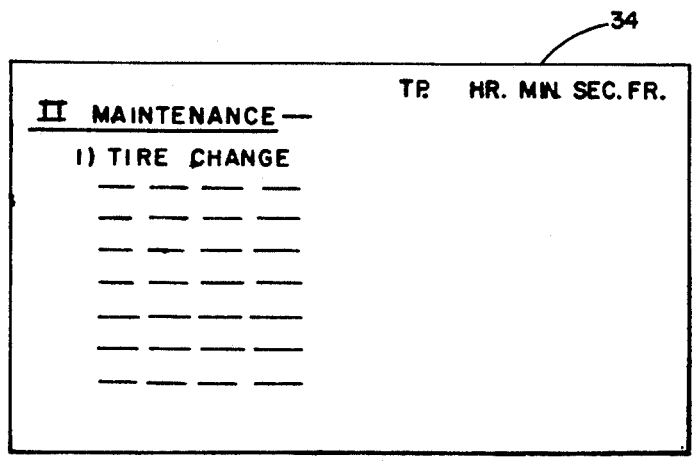

Having thus described the invention in general terms, reference will now be made to the accompanying drawings (one sheet) in which:

FIG. 1 is a schematic elevational view showing a series of sequential presentations of a continuous image medium, such as a video tape, with time code information printed on each of the frames of the continuous image medium;

FIG. 2 is an enlarged view showing a typical time code segment which may appear on any of the frames of the video tape presentation;

FIG. 3 is a fragmentary view of one form of index which may be used with the system of the present invention;

FIG. 4 is a view of a portion of an index presented in a video display in accordance with the present invention;

FIG. 5 is a front elevational view of a video recorder which may be used with the method of the present invention; and FIG. 6 is a schematic view of a portion of the drive mechanism forming part of the video recorder of FIG. 5.

DETAILED DESCRIPTION OF A PREFERRED EMBODIMENTS

Referring now in more detail and by reference characters to the drawings which illustrate a preferred embodiment of the present invention, V designates a series of frames of a video presentation. In this case, the individual frames taken together represent a sequence of illustrations in the use of a hammer. It should be apparent that the images on these frames are only illustrative of a principle of the invention and are not limiting of the invention.

The present invention is described in terms of using a video tape as the medium for presenting the continuous image. While the video tape and video disk form a preferred means for storing and presenting information due to the rapid retrieval, it should be understood that the invention is not so limited.

The term "frame" is used in a broad sense to identify individual images which are presented on a video tape display. Thus, a frame, for example, may represent one complete raster scan on the video display screen.

Each of the individual frames in the video presentation will contain a time code segment, as for example, a rectangular inset portion 12, in the manner as illustrated in FIG. 1. This inset portion 12 may be located in the lower right-hand corner in the manner as illustrated, or at any other desired location of the video presentation. Moreover, in a preferred embodiment, the time code segment will appear in each frame of the video tape presented by the video tape. However, it should be apparent that the time code need only appear in certain of the frames, as for example, ten frames in sequence in which the code appears, with thirty subsequent frames in which the code does not appear, and then ten subsequent frames in which the time code does appear.

FIG. 2 illustrates one embodiment of a particular time code segment 12. In this particular time code segment 12, there is provided a first section 14 which identifies a video tape number. A video tape number to identify a certain video tape in a series of video tapes may be important since a plurality of video tapes may be provided for a particular presentation. A second section 16 identifies the number of hours which have elapsed from the beginning of the video tape. In the embodiment as illustrated, the number of hours which have elapsed is 0. A third section 18 may designate the number of minutes which have elapsed from the beginning of the video tape or otherwise, may designate the number of minutes which have elapsed in the last hour of running the video tape. In this particular presentation, 12 minutes have elapsed from the beginning of the video tape. A next section 20 identifies the number of seconds which have elapsed from the beginning of the last minute in the running video tape. In this illustration, 12 minutes and 45 seconds have elapsed from the beginning of the video tape. A fifth section 22 may also be provided to identify a particular frame number, if desired.

FIG. 3 illustrates one example of an index 30 and which may be bound as part of a printed volume 32. The index 30 may also be present in the form of a printed card which is provided with the video tape itself. In this particular case, the index is shown as an example of information for the use of an automotive vehicle. Thus, a first major heading describes the operation of the vehicle, along with sub-headings describing various components which are used in the operation of the vehicle. A second heading describes the maintenance of the vehicle, again along with sub-headings for maintenance of various portions of the vehicle. To the right of the various entries in the index is a code identifying the particular location on the video tape in which corresponding information may be found. Thus, for example, in this embodiment, information on the operation of the windshield wipers of the vehicle could be found in precisely the location identified in the time segment of FIG. 3. Moreover, immediately to the right of the code containing the time segment, as shown in FIG. 3, there is an additional indicia, such as a page number indicia, identifying, in this case, page 61 of the manual, for information on the vehicle windshield wipers.

Considering the above identified example, if the user of the system desires to obtain information on the operation of the windshield wipers, he or she will turn to page 61 of the manual. In like manner, the user will select the proper video tape, advance the video tape for a distance equivalent to 0 hours, 12 minutes and 45 seconds into the video tape. In this way, the user will have selected a portion of the video tape which starts with information corresponding to that information on page 61 of the manual, namely, operation of the windshield wipers of the vehicle.

In addition to the foregoing, the ending of a time elapse period could also be identified in the index, as well as the beginning, so that a user would know how long the video tape segment presenting that information may be. Thus, for example, the beginning time on a video tape for a particular segment of interest may be 02:25:30 identifying two hours, twenty-five minutes and thirty seconds as the starting time from the beginning of the video tape and an ending time of 03:13:15 identifying three hours, thirteen minutes and fifteen seconds.

The video tape may also be sub-divided into a plurality of sections with each section also containing its own index in visual form. FIG. 4 illustrates one particular video tape frame 34 showing a portion of an index and which may correspond to the index 30. The index on the video frame also contains a second major topic "Maintenance" corresponding to the topic "Maintenance" in the manual with each of the sub-topics included thereunder. Thus, if the viewer of the video tape is merely interested in examining the video tape from beginning to end, there will be subdivisions in which there will be an index presented, such as that index illustrated in FIG. 4, to alert the viewer to that information which is subsequently contained on that portion of the video tape.

FIG. 5 illustrates, in schematic front elevational view, a video recorder R which may be used with the method of the present invention. This video recorder R comprises an outer housing 40 having a video tape insert door 42 which is capable of receiving a conventional video tape 44. The video recorder R may include a read-out display 46 and a bank of a plurality of manually actuable push button switches 48. Included within the bank of push button switches 48 is a power switch, a fast forward switch, a reverse switch and the like. Thus, if the user desired to move a video tape 44 in a fast-forward mode, he or she would merely press on the fast forward switch. In like manner, if it was desired to reverse the tape in direction, the user would actuate the reverse switch.

FIG. 6 illustrates in, schematic form, a portion of the drive unit for moving the tape in a tape cassette 44 in either a fast forward mode or a reverse mode. A drive motor 50 is employed to move the tape in a fast forward mode and a drive motor 52 is employed to move the tape in a reverse mode. Naturally, one motor could be employed if desired. FIG. 6 also shows a schematic connections 54 and 56 connecting the drive motors 50 and 52, respectively to the spindles of the drive tape.

The present invention is highly effective in that it not only functions as a method of using a dual media efficiently for assimilating information, but it also provides a method for locating and quickly accessing information contained on a continuous image presentation medium. In accordance with this arrangement, it is only necessary for a user to locate the time elapse code on a printed index and then advance the continuous image presentation medium to a point on the medium consistent with that time elapse code for displaying selected information. Generally, the user will advance the medium in a fast-forward mode, that is, at a high rate of speed, until the selected time code appears on the display screen. Thereafter, the user will normally play the tape or other medium at the normal operating speed.

The present invention is highly effective in that it literally has enabled a video tape or other image presentation medium to be easily used in conjunction with printed material. Heretofore, the problem of associating information on a video presentation with that in printed material was particularly pronounced in that there was no effective way to enable the user to immediately locate and access information on the video or other continuous image medium corresponding to the information in the printed material. The present invention has completely obviated that problem and has enabled an easy and convenient use of both the printed material and the video tape in combination.

Thus, there has been illustrated and described a unique and novel system and method for rapidly locating and accessing selected information on a continuous image presentation medium when the selected information is not readily accessible by visual examination. The present invention also provides a novel system and method for both locating information in a continuous image presentation medium and which corresponds to information in printed material and also, assimilating information for the purposes of performing a task with such information using dual media. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by letters patent is:

1. A method for rapidly locating and accessing information contained in a continuous image medium without the need of microprocessor implementation, said method comprising:
   a) selecting a topic of information which is desired for visual presentation from the continuous image medium,
   b) examining an index containing titles for the topics of information contained on the continuous image medium,
   c) determining a particular indicia from a code of indicia from the index and which particular indicia is associated with the selected information to enable a locating of that information in the continuous image medium, a code of sequential indicia on the continuous image medium which corresponds to the indicia of the code of indicia on the index and which indicia on the continuous image medium is reproduced from the continuous image medium and capable of being visibly displayed therefrom,
   d) moving the continuous image medium to a selected position until the indicia on the medium which is visibly displayed along with images from the continuous image medium corresponds to the indicia associated with the selected information in the index, and which represents a position on the medium which will provide a display of the selected information, and
   e) examining all or a portion of the selected topic of information on the continuous image medium starting in the region of the selected position on the continuous image medium.

2. The method for locating and accessing information of claim 1 further characterized in that the continuous image medium is a video medium.

3. The method for locating and accessing information of claim 1 further characterized in that the continuous image medium is a video tape.

4. The method for locating information of claim 1 further characterized in that the code of sequential indicia on the continuous image medium are time codes presented on the continuous image medium representing a time elapse from a beginning segment on the continuous image medium.

5. The method of locating information of claim 4 further characterized in that the time codes comprise a time elapse of hours and minutes and second from the beginning of a selected portion of the continuous image medium.

6. The method of locating information of claim 2 further characterized in that the index is a printed index and is used in conjunction with a manual and which contains information corresponding to that on the continuous image medium so that the user may examine the information in the manual as well as corresponding information on the continuous image medium.

7. A method for locating information contained in a continuous image medium corresponding to information in a printed document without the need of a microprocessor implementation and which information in the printed document is directly related to the information on that continuous image medium, said method comprising:
   a) selecting a topic of information required for a desired purpose and which topic of information is contained in the printed document,
   b) determining a particular indicia from a code of indicia contained in the printed document and which particular indicia is associated with the selected topic of information to enable a locating of related information in a continuous image medium, said code of indicia in the printed document corresponding to a like code of sequential indicia recorded on the continuous image medium and to be reproduced from the continuous image medium so that a correspondence of particular indicia in the printed document to that displayed from the continuous image medium represents a desired location on the continuous image medium for display of the selected topic of information,
   c) moving the continuous image medium to a selected position until the indicia visually displayed therefrom corresponds to the indicia associated with the selected information in the printed document, and
   d) examining all or a portion of the selected topic of information on the continuous image medium starting in the region of the selected position on the continuous image medium in conjunction with the information contained in the printed document.

8. The method for locating information of claim 7 further characterized in that the printed document is a manual containing a plurality of pages of information and that the continuous image medium contains displays which provide pictorial illustrations of the information contained in the manual.

9. The method for locating information of claim 7 further characterized in that the code of sequential indicia on the continuous image medium are time codes presented on the continuous image medium representing a time elapse from a beginning segment on the continuous image medium.

10. The method of locating information of claim 9 further characterized in that the indicia on the printed document are the same time codes on and correspond to those on the continuous image medium.

11. The method of locating information of claim 10 further characterized in that the time codes comprise a time elapse of hours and minutes and seconds from the beginning of a selected portion of the continuous image medium.

12. The method of locating information of claim 7 further characterized in that a printed index forms part of the printed document and which printed index contains a summary of contents of the printed document and page numbers to locate selected pages containing information in the manual as well as the code of indicia to locate corresponding information on the continuous image medium.

13. The method of locating information of claim 7 further characterized in that the continuous image medium is a video medium.

14. The method for locating information of claim 7 further characterized in that the method comprises moving the continuous image medium at a fast-forward speed from a beginning of a continuous image medium to the selected position and thereafter moving the continuous image medium at a normal play speed after reaching the selected position.

15. A method of assimilating information and performing a task with such information without the need of a microprocessor implementation, said method comprising:
   a) examining a first index in a printed document to locate selected information in that document relating to the performance of a task,
   b) locating the selected information in the printed document relating to the performance of the task,
   c) examining a second index containing a time elapse time code in a continuous image medium to identify information on the continuous image medium relating to the performance of such task,
   d) obtaining a particular time elapse from a time code in first index and which particular time elapse corresponds to a particular time elapse in the time code in the second index and where the time elapses on the continuous image medium are capable of being visibly displayed therefrom, the particular selected time elapse on the continuous image medium representing a position on the continuous image medium in which the information on the continuous image medium corresponding to the selected information on the printed document may be displayed,
   e) advancing the continuous image medium to a position where information on the continuous image medium relating to such task commences from the point that the continuous image medium contains such time elapse,
   f) examining the selected information in the document relating to such task, and
   g) simultaneously with or in a closely related time interval and examining the selected information in the document also examining the information on the continuous image medium related to such task.

16. The method of assimilating information and performing a task of claim 15 further characterized in that the printed document is a manual containing a plurality of pages of information and that the continuous image medium contains displays which provide pictorial illustrations of the information contained in the manual.

17. The method of assimilating information and performing a task of claim 15 further characterized in that the time codes comprise a time elapse of hours and minutes and seconds from the beginning of a selected portion of the continuous image medium.

18. The method of assimilating information and performing a task of claim 15 further characterized in that the method comprises moving the continuous image medium at a fast forward speed from a beginning of the continuous image medium to a portion which contains information on the performance of said task and thereafter moving the continuous image medium at a normal record and play speed after reaching such portion.

19. An indexing system for rapidly locating and accessing information contained in a continuous image medium without the need of microprocessor implementation, said system comprising:
  a) an index having an identification about topics of information contained in the continuous image medium and a code of indicia in that index for locating certain of the information on the continuous image medium which is desired for presentation, the particular indicia on the code of indicia in the index representing locations on the continuous image medium which contains visual presentations about the desired information,
  b) a code of additional indicia containing sequential indicia on certain of the frames of the continuous image medium and being reproduced from the continuous image medium in visible format, the code of indicia on the index corresponding to the code of sequential indicia on the continuous image medium so that a correspondence of a particular selected indicia on the index with a like particular indicia on the continuous image medium represents a desired location on the continuous image medium in which the desired information may be displayed, such that a user of the system may locate a portion of the continuous image medium containing the desired visual presentations by locating the corresponding particular indicia in the continuous image medium.

20. The indexing system for rapidly locating and accessing information of claim 19 further characterized in that the additional indicia is the same as the indicia in the index.

21. The indexing system for rapidly locating and accessing information of claim 19 further characterized in that the indicia on the continuous image medium are time codes presented on the continuous images representing a time elapse from a beginning segment on the continuous image medium.

22. The indexing system for rapidly locating and accessing information of claim 21 further characterized in that the time codes comprise a time elapse of hours and minutes and seconds from the beginning of a selected portion of the continuous image medium.

23. An indexing system for presenting information contained in two different media without the need of microprocessor implementation, said system comprising:
  a) a multi-page printed document containing information which may be required,
  b) a first index relating to the printed document and having a code of indicia for locating certain of the information which is desired in the printed document, the code of indicia on the index corresponding to the indicia on the pages of the document to enable location of the pages in the document containing the desired information,
  c) a second index having a code of additional indicia containing sequential indicia representing locations on a continuous image medium which contains presentations corresponding to the desired information in said printed document,
  d) indicia from the code of additional sequential indicia being present on certain of the frames of the continuous image medium and being reproduced from the continuous image medium in visible format, the code of indicia on the second index corresponding to the code of sequential indicia on the continuous image medium so that a correspondence of a particular selected indicia on the second index with a like particular indicia on the continuous image medium represents a position on the continuous image medium in which the presentations corresponding to the desired information in the printed document can be displayed, such that a user of the system may locate a portion of the continuous image medium containing visual image presentations by locating on the continuous image medium the selected indicia identified in the second index.

24. The indexing system for presenting information of claim 23 further characterized in that the additional indicia on the continuous image medium is the same as the indicia in the second index.

25. The indexing system for presenting information of claim 23 further characterized in that the indicia on the continuous image medium are time codes presented on the continuous image medium representing a time elapse from a beginning segment on the continuous image medium.

26. The indexing system for presenting information of claim 25 further characterized in that the indicia on the printed document are the same time codes and corresponds to those on the continuous image medium.

* * * * *